US012627616B2

(12) United States Patent
Chong et al.

(10) Patent No.: US 12,627,616 B2
(45) Date of Patent: May 12, 2026

(54) POLICY DETERMINING OR RESOURCE ALLOCATION METHOD FOR COMPUTING SERVICE AND NETWORK ELEMENT

(71) Applicant: VIVO MOBILE COMMUNICATION CO., LTD., Dongguan (CN)

(72) Inventors: Weiwei Chong, Dongguan (CN); Yanchao Kang, Dongguan (CN); Xiaobo Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 4 days.

(21) Appl. No.: 18/437,330

(22) Filed: Feb. 9, 2024

(65) Prior Publication Data

US 2024/0179105 A1     May 30, 2024

Related U.S. Application Data

(63) Continuation of application No. PCT/CN2022/111187, filed on Aug. 9, 2022.

(30) Foreign Application Priority Data

Aug. 10, 2021     (CN) .......................... 202110914787.2

(51) Int. Cl.
*H04L 47/80* (2022.01)
*H04L 47/72* (2022.01)
(52) U.S. Cl.
CPC ............ *H04L 47/805* (2013.01); *H04L 47/72* (2013.01)

(58) Field of Classification Search
CPC ... H04L 47/805; H04L 47/72; H04L 41/5045; H04L 41/0894; H04L 67/146; G06F 9/50
See application file for complete search history.

(56) References Cited

U.S. PATENT DOCUMENTS

2016/0043968 A1* 2/2016 Jacob .................... H04L 47/827
                                                                  709/226
2017/0359186 A1* 12/2017 Atarius ............. H04W 72/0446
(Continued)

FOREIGN PATENT DOCUMENTS

CN         110740430 A      1/2020
CN         110831088 A      2/2020
(Continued)

OTHER PUBLICATIONS

China Telecom, "Discussion on paper on Network & Computing Power Integration", 3GPP tsg_salwg2_arch, Oct. 11, 2021, S2-2107563.
(Continued)

*Primary Examiner* — Chris Parry
*Assistant Examiner* — Steven C Nguyen
(74) *Attorney, Agent, or Firm* — The Webb Law Firm

(57) ABSTRACT

A policy determining or resource allocation method includes obtaining, by a policy control network element and a computing service request from a server. The computing service request includes computing service description information of a target computing service of a terminal device, and the computing service request is used for requesting allocation of computing power resources for the target computing service; and determining, by the policy control network element, a target QoS policy for the target computing service based on the computing service description information. The target QoS policy includes a computing power QoS policy.

17 Claims, 7 Drawing Sheets

(56) References Cited

U.S. PATENT DOCUMENTS

| | | | | |
|---|---|---|---|---|
| 2018/0115927 A1* | 4/2018 | Vesterinen | ........ | H04W 36/0072 |
| 2020/0374238 A1* | 11/2020 | Momchilov | .......... | H04L 47/822 |
| 2020/0374742 A1* | 11/2020 | Chong | ................ | H04W 72/542 |
| 2020/0383005 A1* | 12/2020 | Wu | ........................... | H04L 9/40 |
| 2022/0400502 A1* | 12/2022 | Maeder | ................ | H04W 72/53 |

FOREIGN PATENT DOCUMENTS

| | | |
|---|---|---|
| CN | 111082997 A | 4/2020 |
| CN | 112839382 A | 5/2021 |

OTHER PUBLICATIONS

Nokia et al., "KI#2, Sol#4: Updates for Deterministic QoS for UE-UE TSC communication", Sa WG2 Meeting #139E, Jun. 1-12, 2020, S2-2004136.

* cited by examiner

12

Network-side
device

11

11

Terminal

Terminal

A policy control network element obtains a computing
service request from a server ~ 201

The policy control network element determines a target
quality of service QoS policy for a target computing
service based on computing service description
information of the target computing service ~ 202

POLICY DETERMINING OR RESOURCE ALLOCATION METHOD FOR COMPUTING SERVICE AND NETWORK ELEMENT

CROSS-REFERENCES TO RELATED APPLICATIONS

This application is a Bypass Continuation Application of International Patent Application No. PCT/CN2022/111187, filed Aug. 9, 2022, and claims priority to Chinese Patent Application No. 202110914787.2, filed Aug. 10, 2021, the disclosures of which are hereby incorporated by reference in their entireties.

BACKGROUND OF THE INVENTION

Field of the Invention

Embodiments of this application relate to the field of communications technologies, and in particular, to a policy determining or resource allocation method for a computing service and a network element.

Description of Related Art

A packet data unit (PDU) session modification procedure of user equipment (UE) includes the following steps: When data transmission is required between a server and a UE, a service establishment procedure is initiated to a policy control network element (PCF), so that the PCF triggers a PDU session modification procedure with a session management network element (SMF); during the PDU session modification procedure, a quality of service (QOS) flow (QOS flow) in the PDU session may be modified or a new QoS flow may be established; and subsequently, the server may transmit data based on the modified QoS flow or the new corresponding QoS flow for the PDU session.

However, currently, operator networks can provide only data transmission pipelines (for data transmission between UEs and target nodes) with a quality of service guarantee but cannot provide open computing power resources for terminal devices, other network devices, third-party devices, and the like.

SUMMARY OF THE INVENTION

Embodiments of this application provide a policy determining or resource allocation method and apparatus for a computing service, a network element, and a medium.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the associated objects have an "or" relationship.

It should be noted that the technologies described in the embodiments of this application are not limited to long term evolution (LTE)/LTE-Advanced (LTE-A) systems, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communications system.

Figure 1:
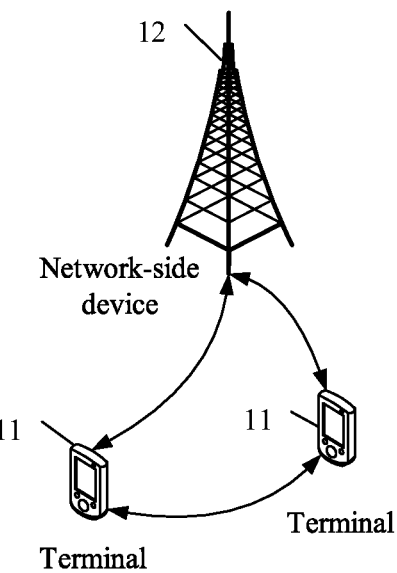
FIG. 1 is a schematic diagram of a possible architecture of a communications system according to an embodiment of this application.

FIG. 1 is a block diagram of a wireless communications system to which embodiments of this application are applicable. The wireless communications system includes a terminal device 11 and a network-side device 12.

The terminal device 11 may be a UE, a mobile phone, a tablet personal computer, a laptop computer or a notebook computer, a personal digital assistant (PDA), a palmtop computer, a netbook, an ultra-mobile personal computer (UMPC), a mobile Internet device (MID), an augmented reality (AR)/virtual reality (VR) device, a robot, a wearable device, vehicular user equipment (VUE), or pedestrian user equipment (PUE), a smart appliance (a home appliance with a wireless communication function, for example, a refrigerator, a television, a washing machine, or furniture). The wearable device includes a smart watch, a smart band, a smart headphone, smart glasses, smart jewelry (smart bangle, smart bracelet, smart ring, smart necklace, smart anklet, a smart ankle bracelet, and the like), a smart wristband, smart clothing, a gaming console, and the like. It should be noted that a specific type of the terminal device 11 is not limited in the embodiments of this application.

The foregoing network-side device 12 may include a policy control network element, a mobility management network element, a session management network element, and a computing power control network element.

For example, in a 5G system, the policy control network element may be a PCF, the mobility management network element may be an access and mobility management network element (AMF), the session management network element may be an SMF, and the computing power control network element may be a network element capable of allocating computing power resources.

It should be noted that in other systems, the foregoing network elements may be network elements with a same function or of a same type, but may possibly have different designations, which is not limited in embodiments of this application.

It should be noted that the policy control network element in the embodiments of this application may be deployed independently as an independent logic module or may be a sub-function module in the session management network element, which is not limited in the embodiments of this application In addition, in a case that functions of the session management network element and the policy control network element are integrated into one network element device, the steps of interaction between the session management network element and the policy control network element may be omitted or performed together. For example, when the policy control network element sends a policy modification request to the session management network element, this step may be omitted in a case that functions of the two are integrated into one network element.

The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. Provided that the same technical effect is achieved, the base station is not limited to a specific technical term. It should be noted that the base station in the NR system is only used as an example in the embodiments of this application, but a specific type of the base station is not limited.

The following is an explanation of some predetermined concepts and definitions included in this application, which is applicable to all embodiments of this application.

1. Service Requirement of a Computing Service

It can be understood that the service requirement of a computing service comes from demands for the computing service of a terminal device. The concept is similar to computing a more accurate result in a shorter time.

For example, the service requirement of the computing service includes but is not limited to the following measurement information:

1) accuracy of computing service=computing credibility (of a platform)*bit error rate of data transmission, where a success rate of the computing service is used to represent an overall accuracy of the computing service; and 2) latency of computing service=computing latency+transmission latency, where the latency of the computing service is used to represent the overall latency overhead required for completing the computing service.

For example, a network side may generate specific network requirements based on the service requirement of the computing service, where the network requirements include a communication quality of service QoS requirement and a computing power quality of service QoS requirement.

2. Computing Power QoS

For example, the computing power QoS includes but is not limited to at least one of the following metrics for measuring quality of the computing power:

i. computing latency, used to represent the time required for a computing power resource node to complete a computing service; or ii. computing credibility, used to represent the computing service accuracy of a computing power resource node.

3. Communication QoS

For example, the communication QoS includes but is not limited to at least one of the following metrics for measuring quality of communication transmission:

i. transmission latency;

ii. bandwidth; or iii. bit error rate.

For example, a computing session is a special session between a UE and a management control/computing power resource node. User-plane data transmission of a computing session is carried in a PDU session, that is, being transmitted using a PDU session channel to a computing power resource node for operation. A computing session identifier (ID) is used to identify a computing session, assigned by the UE and sent to a network upon establishment of the computing session. A one-to-one binding relationship is present between the computing session ID and the PDU session ID. The binding relationship is determined by the UE and sent to the network upon the establishment of the computing session.

For example, the PDU session ID is an ID of a session management layer between the UE and the SMF.

For example, a correspondence between the computing session and the PDU session is as follows: the computing session corresponds to the PDU session on a one-to-one basis, and the computing session corresponds to the QoS flow/bearer on a one-to-one basis.

It should be noted that the steps in various embodiments of this application are merely for illustration purposes and may not be mandatory.

The following describes in detail the technical solution provided in the embodiments of this application by using some embodiments and application scenarios thereof with reference to the accompanying drawings.

Figure 2:
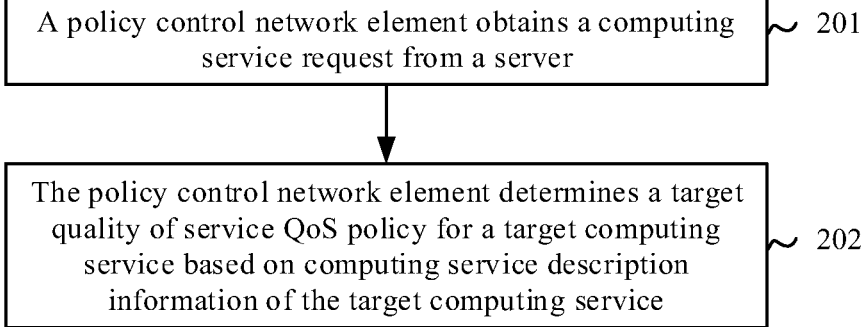
FIG. 2 is a schematic flowchart of a policy determining method for a computing service according to an embodiment of this application.

An embodiment of this application provides a policy determining method for a computing service. As shown in FIG. 2, the method is applied to a policy control network element. The method provided in this embodiment of this application includes the following steps.

Step 201. A policy control network element obtains a computing service request from a server.

Step 202. The policy control network element determines a target quality of service QoS policy for a target computing service based on computing service description information of the target computing service.

In this embodiment of this application, the computing service request includes the computing service description information of the target computing service of a terminal device, the computing service request is used for requesting allocation of computing power resources for the target computing service, and the target QoS policy includes a computing power QoS policy.

In this embodiment of this application, the terminal device may interact with the server on its own computing service requirement through an application layer. For example, content of the interaction includes at least the computing service description information of the target computing service.

Optionally, in this embodiment of this application, the computing service request is further used for requesting allocation of communication resources for the target computing service. In this case, the target QoS policy further includes a communication QoS policy.

Optionally, in this embodiment of this application, the computing service description information includes at least one of the following: a type of the computing service, an aim of the computing service, a service requirement of the computing service, an IP address of the computing service, or port number information corresponding to the computing service.

Optionally, in this embodiment of this application, the server herein may be a third-party server or a network element on the network side, which is not limited in this application.

Optionally, in this embodiment of this application, the policy control network element needs to ensure that a sum of latency in the assigned communication QoS policy plus latency in the computing power QoS policy does not exceed the latency in the service requirement of the target computing service requested by the terminal device. In addition, the policy control network element needs to ensure that the data transmission accuracy in the assigned communication QoS policy (which may be 1-PER) multiplied by the computation accuracy in the computing power QoS policy is not lower than the accuracy in the service requirement of the target computing service requested by the terminal device.

Optionally, in this embodiment of this application, the computing power QoS policy and/or the communication QoS policy may be sent by the server directly to the policy control network element, or may be determined by the policy control network element based on the server requirement of the target computing service sent by the server to the policy control network element.

In one possible example, the service requirement of the computing service includes at least one of the following: a latency requirement of the computing service (for example, the latency of the computing service is 10 ms) or an accuracy rate requirement of the computing service (for example, an error rate of the computing service is not high than 0.1%). In another possible example, step 202 may include:

Step 202*a*. The policy control network element obtains a computing power QoS requirement by breaking down a service requirement of the target computing service based on the computing service description information of the target computing service, and the policy control network element determines a computing power QoS policy for the target computing service based on the computing power QoS requirement.

Optionally, in this embodiment of this application, step 202 may include:

Step 202*b*. The policy control network element obtains a computing power QoS requirement and a communication QoS requirement by breaking down a service requirement of the computing service based on the service requirement of the computing service in the computing service description information of the target computing service, and the policy control network element determines a computing power QoS policy for the target computing service based on the computing power QoS requirement and a communication QoS policy for the target computing service based on the communication QoS requirement.

Optionally, in this embodiment of this application, after step 202, the policy determining method for a computing service provided in this embodiment of this application may further include:

Step A1. The policy control network element sends a computing power QoS policy to a computing power control network element.

The computing power QoS policy is used to trigger the computing power control network element to allocate computing power resources for the target computing service based on the computing power QoS policy. In other words, after receiving the computing power QoS policy, the computing power control network element may allocate the computing power resources for the target computing service based on the computing power QoS policy.

For example, before sending the computing power QoS policy to the computing power control network element, the policy control network element may select an appropriate computing power control network element for allocation of the computing power resources.

For example, the policy control network element may select a computing power control network element based on at least one of the following information:

a target area;

subscription information related to the target computing service of the terminal device;

a data network name (DNN);

single network slice selection assistance information (S-NSSAI); or computing service description information of the target computing service.

For example, the target area may be an area of interest (AOI). Further, the AOI may include a current location of the terminal device or specified area information provided by the server.

It should be noted that the policy control network element may determine to select an appropriate computing power control network element based on its own configuration information, in combination with the foregoing considerations. Alternatively, the policy control network element may send the foregoing reference factors to an NRF and query the NRF for a matching computing power control network element. The manner of selecting a specific network element is not limited in this embodiment of this application.

For example, before selecting a computing power control network element, the policy control network element needs to request subscription data of the terminal device from a unified data management (UDM)/unified data repository (UDR) network element, in order to verify whether the terminal device has subscription information related to the target computing service. If the terminal device has subscription information related to the target computing service, subsequent procedures (including the selection of a computing power control network element) are performed; and if the terminal device does not have subscription information related to the target computing service, the policy control network element rejects the request from the server.

Optionally, in this embodiment of this application, step A1 may include step A1a:

Step A1a. The policy control network element sends a computing power QoS policy to the computing power control network element via the session management network element.

Optionally, in this embodiment of this application, after step A1, the policy determining method for a computing service provided in this embodiment of this application may further include the following steps.

Step A2. The policy control network element receives, from the computing power control network element, network element information of a computing network element corresponding to the computing power resources, where the network element information includes network element identifier information or network element address information.

For example, the network element identifier information may be fully qualified domain name (FQDN) information of the network element. The network element address information may be IP address information of the network element.

Step A3. The policy control network element sends a computing service response to the server, where the computing service response includes the network element information of the computing network element corresponding to the computing power resources.

For example, the computing service response may further include the computing power QoS policy and/or the communication QoS policy.

For example, the computing service response may further include a quality of service value of the target computing service (for example, a latency value that is actually achievable and/or a computing readiness rate value that is actually achieved), evaluated by the policy control network element, that is actually achievable with the computing power QoS policy and/or the communication QoS policy.

In this way, the server obtains relevant information (for example, the IP address of the computing network element, computing capacity, and achievable quality of service value) of the computing network element for the computing power resources allocated by the network for the target computing service of the terminal device. Subsequently, the server can send the foregoing information to the terminal device through the application layer, allowing the terminal device to utilize these information and a corresponding PDU tunnel for sending a computing service to the computing network element. In this way, the target computing service can be completed using computing power resources of the network.

Optionally, in this embodiment of this application, in a case that the policy control network element determines a communication QoS policy for the target computing service, the policy determining method for a computing service provided in this embodiment of this application may further include the following step:

Step A4. The policy control network element sends the communication QoS policy to a session management network element.

The communication QoS policy is used to trigger the session management network element to allocate the communication resources for the target computing service (that is, to allocate an appropriate PDU session transmission tunnel for the target computing service) based on the communication QoS policy.

For example, the policy control network element may query the session management network element (for example, a serving SMF) corresponding to the terminal device based on its own history data or query the UDM for the session management network element (for example, a serving SMF) corresponding to the terminal device.

Optionally, in this embodiment of this application, step A4 may include step A4a:

step A4a. In a case that the communication QoS policy is different from a current communication QoS policy corresponding to the terminal device, the policy control network element sends a policy modification request to the session management network element, where the policy modification request includes the communication QoS policy.

In one possible example, a condition of triggering the policy control network element to send the policy modification request to the session management network element may be that: the policy control network element determines that the current session management policy (for example, an SM policy) corresponding to the UE needs to be modified. In other words, in a case that the session management policy in the communication QoS policy determined by the policy control network element for the target computing service is different from the session management policy in the current communication QoS policy corresponding to the terminal device, that is, in a case of determining that the current PDU session of the terminal device does not satisfy the foregoing communication QoS policy, the policy control network element sends a policy modification request to the session management network element to request a modification of the communication QoS policy.

In one possible example, the policy control network element receives a policy modification response from the session management network element, where the policy modification response is used to inform whether the communication QoS policy is successfully modified.

In the policy determining method for a computing service provided in this embodiment of this application, after obtaining a computing service request for the target computing service of the terminal device from the server, the policy control network element may assign a target quality of service QoS policy for the target computing serviced. The target QoS policy includes the computing power QoS policy. This ensures that the network of an operator can allocate corresponding computing power resources and/or communication resources for the target computing service. Therefore, the computing service-related data of the terminal device can be transmitted to the computing power resources, and a computing result is provided after computation by the computing power resources. This enables common terminal devices to complete computing services without requiring strong computing capability, reducing costs, power consumption, and the like for the terminal devices.

Figure 3:
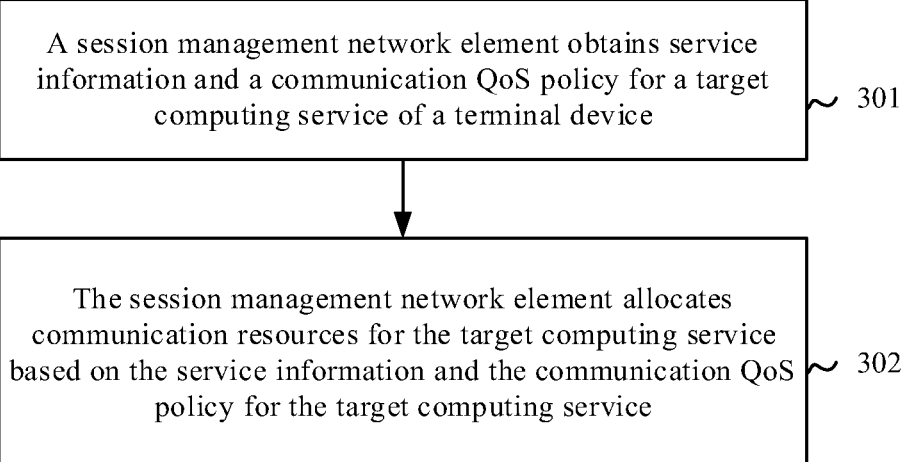
FIG. 3 is a first schematic flowchart of a resource allocation method for a computing service according to an embodiment of this application.

An embodiment of this application provides a resource allocation method for a computing service. As shown in FIG. 3, the method is applied to a session management network element and includes the following steps:

Step 301. A session management network element obtains service information and a communication QoS policy for a target computing service of a terminal device.

Step 302. The session management network element allocates communication resources for the target computing service based on the service information and the communication QoS policy for the target computing service.

Optionally, in this embodiment of this application, the service information of the target computing service includes at least one of the following: computing service identification information, packet data unit PDU session identifier information associated with the computing service, requested type information corresponding to the PDU session, computing service description information, a data network name (DNN), or S-NSSAI. The computing service description information includes at least one of the following: a type of the computing service, an aim of the computing service, a service requirement of the computing service, an IP address of the computing service, or port number information corresponding to the computing service.

For example, the computing service identification information may include a terminal device ID and a computing session ID. The packet data unit PDU session identifier information corresponding to the computing service may include a PDU session ID corresponding to the computing service. The S-NSSAI may be slice identification information corresponding to the computing service. The DNN may be a data network name corresponding to the computing service (for example, an IP multimedia subsystem (IMS) DNN or an Internet DNN).

Optionally, in this embodiment of this application, the service requirement of the computing service includes at least one of the following: a latency requirement of the computing service or an accuracy rate requirement of the computing service.

Optionally, in this embodiment of this application, step 302 may include the following step:

Step 302*a*. The session management network element establishes a tunnel for a PDU session of the terminal device based on the service information of the target computing service and the communication QoS policy.

It can be understood that the session management network element may trigger a PDU session modification procedure based on the service information of the target computing service and the communication QoS policy, so as to establish a tunnel for the PDU session of the terminal device. The tunnel for the PDU session is used for transmitting data of the target computing service.

Optionally, in this embodiment of this application, step 301 may include the following step:

Step 301*a*. The session management network element obtains a policy modification request from a policy control network element, where the policy modification request includes the service information and the communication QoS policy for the target computing service.

For example, the policy modification request is used to trigger a QoS policy modification procedure, and the QoS policy modification procedure will then trigger the session management network element to initiate a PDU session modification procedure for modifying a QoS flow or establishing a new QoS flow in the PDU session, so as to ensure that the QoS flow can match the corresponding QoS policy for the target computing service. For example, the procedure for modifying an N4 session is the same as that in the prior art. For example, the N3 tunnel establishment or modification procedure for triggering QoS flow modification or establishment is the same as that in the prior art.

Optionally, in this embodiment of this application, the resource allocation method for a computing service provided in this embodiment of this application may include the following step B1:

Step B1. The session management network element sends a communication QoS policy request to the policy control network element, where the communication QoS policy request is used for requesting the corresponding communication QoS policy for the target computing service.

Optionally, in this embodiment of this application, the resource allocation method for a computing service provided in this embodiment of this application may include the following step B2:

Step B2. The session management network element obtains a computing power QoS policy corresponding to the target computing service from the policy control network element, and the session management network element sends the computing power QoS policy to a computing power control network element, where the computing power QoS policy is used for the computing power control network element to allocate computing power resources for the target computing service.

Optionally, in this embodiment of this application, the session management network element may actively or passively send the computing power QoS policy to the computing power control network element. In passive mode, the computing power QoS policy is passively sent upon receipt of the computing power QoS policy request from the computing power control network element.

In a possible implementation, the resource allocation method for a computing services provided in this embodiment of this application may include the following step B31:

Step B31. The session management network element selects the computing power control network element based on first information.

The first information includes at least one of the following:

a target area (refer to the foregoing description for details);

subscription information related to the target computing service of the terminal device;

DNN;

S-NSSAI; or computing service description information of the target computing service.

For example, after actively selecting a computing power control network element based on the first information, the session management network element may send the computing power QoS policy to the computing power control network element.

In another possible implementation, the resource allocation method for a computing service provided in this embodiment of this application may include the following step B32:

Step B32. The session management network element receives a computing power QoS policy request from the computing power control network element, where the computing power QoS policy request is used for requesting the computing power QoS policy corresponding to the target computing service; and the session management network element sends the computing power QoS policy request to the policy control network element.

For example, after receiving the computing power QoS policy request, the session management network element forwards it to the policy control network element so as to enable the policy control network element to assign a corresponding computing power QoS policy to the computing power control network element.

Optionally, in this embodiment of this application, the resource allocation method for a computing service provided in this embodiment of this application may include the following step B4:

Step B4. The session management network element receives from the computing power control network element, network element information of a computing network element corresponding to the computing power resources, where the network element information includes network element identifier information or network element address information; and the session management network element sends the network element information to the policy control network element.

Optionally, in this embodiment of this application, the resource allocation method for a computing service provided in this embodiment of this application may include the following step B5:

Step B5. The session management network element sends a PDU session modification instruction to the terminal device, where the PDU session modification instruction includes partial or complete information of the communication QoS policy.

Optionally, in this embodiment of this application, the session management network element and the computing power control network element may interact on allocation status information, to notify each other of the allocation status information of their own resources.

For example, the resource allocation method for a computing service provided in this embodiment of this application may include the following step B6:

Step B6. The session management network element sends allocation status information of the communication resources to a computing power control network element; and/or the session management network element receives allocation status information of computing power resources from a computing power control network element.

For example, the allocation status information may indicate whether the corresponding computing power resources or communication resources are allocated, as well as a type and quantity of the allocated resources and QoS achievable.

In the resource allocation method for a computing service provided in the embodiment of this application, after obtaining the service information and the communication QoS policy for the target computing service, the session management network element may allocate communication resources for the target computing service based on the service information and the communication QoS policy for the target computing service. This ensures that the network of an operator can allocate corresponding communication resources for the target computing service. Therefore, the computing service-related data of the terminal device can be transmitted to the computing power resources through a corresponding PDU tunnel, and a computing result is provided after computation by the computing power resources. This enables common terminal devices to complete computing services without requiring strong computing capability, reducing costs, power consumption, and the like for the terminal devices.

Figure 4:
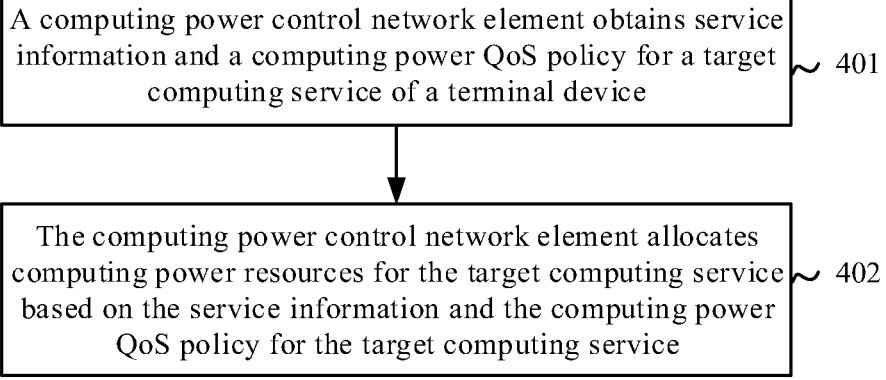
FIG. 4 is a second schematic flowchart of a resource allocation method for a computing service according to an embodiment of this application.

An embodiment of this application provides a resource allocation method for a computing service. As shown in FIG. 4, the method is applied to a computing power control network element and includes the following steps:

Step 401. A computing power control network element obtains service information and a computing power QoS policy for a target computing service of a terminal device.

Step 402. The computing power control network element allocates computing power resources for the target computing service based on the service information and the computing power QoS policy for the target computing service.

Optionally, in this embodiment of this application, the computing power QoS includes at least one of the following metrics: computing power, sample data amount, storage, computing latency, computation accuracy, or computing speed.

Optionally, in this embodiment of this application, the service information of the target computing service includes at least one of the following: computing service identification information, PDU session identifier information associated with the computing service, computing service description information, a data network name (DNN), or S-NSSAI. The computing service description information includes at least one of the following: a type of the computing service, an aim of the computing service, a service requirement of the computing service, an IP address of the computing service, or port number information corresponding to the computing service.

Optionally, in this embodiment of this application, the service requirement of the computing service includes at least one of the following: a latency requirement of the computing service or an accuracy rate requirement of the computing service.

Optionally, in this embodiment of this application, the computing power resources include at least one of the following: computing power resources or storage resources. For example, at least 100 units of GPU resources are allocated for computing, and 100 units of storage resources are allocated for storage.

Optionally, in this embodiment of this application, step 402 may include the following step:

Step 402a. The computing power control network element selects a computing network element based on the service information and the computing power QoS policy for the target computing service. The computing network element can provide the computing power resources corresponding to the target computing service.

It should be noted that the computing network element in the embodiment of this application has a computing function and a storage function. The two functions may be deployed on one network element or on different network elements separately. That is, the computing network element may include one or more network elements.

It should be noted that the computing power control network element needs to ensure that the computing power of the selected computing function network element can satisfy the computing power resource requirements in the computing power QoS policy (for example, at least 100 units of GPU resources and supporting a specific algorithm (for example, deep neural networks (DNN))); and/or, the computing power control network element needs to ensure that the storage capacity of the selected storage function network element can satisfy the storage resource requirements in the computing power QoS policy (for example, 100 units of storage resources).

Optionally, in this embodiment of this application, step 401 may include the following step:

step 401a. The computing power control network element obtains the service information and the computing power QoS policy for the target computing service from a policy control network element; or step 401b. The computing power control network element obtains the service information and the computing power QoS policy for the target computing service from a session management network element.

Optionally, in this embodiment of this application, the resource allocation method for a computing service provided in this embodiment of this application may include the following step C1:

Step C1. The computing power control network element sends a computing power QoS policy request to the policy control network element, where the computing power QoS policy request is used for requesting the computing power QoS policy corresponding to the target computing service.

Optionally, in this embodiment of this application, after step 402, the resource allocation method for a computing service provided in the embodiment of this application may include the following step C2:

Step C2. The computing power control network element sends a first computing service response to a session management network element or a policy control network element; where the first computing service response includes network element information of a computing network element corresponding to the computing power resources, and the network element information includes network element identifier information or network element address information.

For example, the identification information of the computing network element is used for addressing the computing network element, which may be, for example, an FQDN of the network element. This allows a terminal device to transmit data of the target computing service in the uplink to the computing network element for computation. Alternatively, the network element address information may be an IP address of the network element, which is used as the destination IP address for the data of the target computing service to be transmitted by the terminal device in the uplink, to ensure that the data of the target computing service can reach the computing network element for computation.

For example, the first computing service response further includes PDU session identifier information associated with the target computing service.

Optionally, in this embodiment of this application, the session management network element and the computing power control network element may interact on allocation status information, to notify each other of the allocation status information of their own resources.

For example, the resource allocation method for a computing service provided in the embodiment of this application may include the following step C3.

Step C3. The computing power control network element sends allocation status information of the computing power resources to a session management network element; and/or the computing power control network element receives allocation status information of communication resources from a session management network element.

For example, the allocation status information may indicate whether the corresponding computing power resources or communication resources are allocated, as well as a type and quantity of the allocated resources and QoS achievable.

In the resource allocation method for a computing service provided in the embodiment of this application, after obtaining the service information and the computing power QoS policy for the target computing service, the computing power control network element may allocate computing power resources for the target computing service based on the service information and the computing power QoS policy for the target computing service. This ensures that the network of an operator can allocate corresponding computing power resources for the target computing service. Therefore, the computing service-related data of the terminal device can be transmitted to the computing power resources, and a computing result is provided after computation by the computing power resources. This enables common terminal devices to complete computing services without requiring strong computing capability, reducing costs, power consumption, and the like for the terminal devices.

It should be noted that the technical terms and relevant explanations in the embodiments of this application can be used in other embodiments.

It should be noted that in the technical solution provided in the embodiment of this application, the procedure for modifying an associated PDU session is mainly initiated by triggering the allocation of computing power resources. Certainly, the network side may trigger the modification of a PDU session (for example, triggering the modification of a PDU session in a case that communication QoS is satisfied) or may not trigger a modification of a PDU session (for example, triggering the establishment of a new dedicated QoS flow in a case that communication QoS is not satisfied). In one example, in a case that the existing PDU session can satisfy the data transmission requirements of a computing service, the PDU session modification procedure does not need to be triggered. That is, the session management network element does not need to initiate a corresponding operation.

The technical solution provided in the embodiment of this application will be illustrated below using several examples.

The following examples assume that the server is an AF, the policy control network element is a PCF, the mobility management network element is an AMF, the session management network element is an SMF, and the terminal device is a UE. It should be noted that the network element names in the following examples are merely for illustration, and other network element names may be used in practical application. This is not limited in the embodiments of this application.

Embodiment 1

Figure 5:
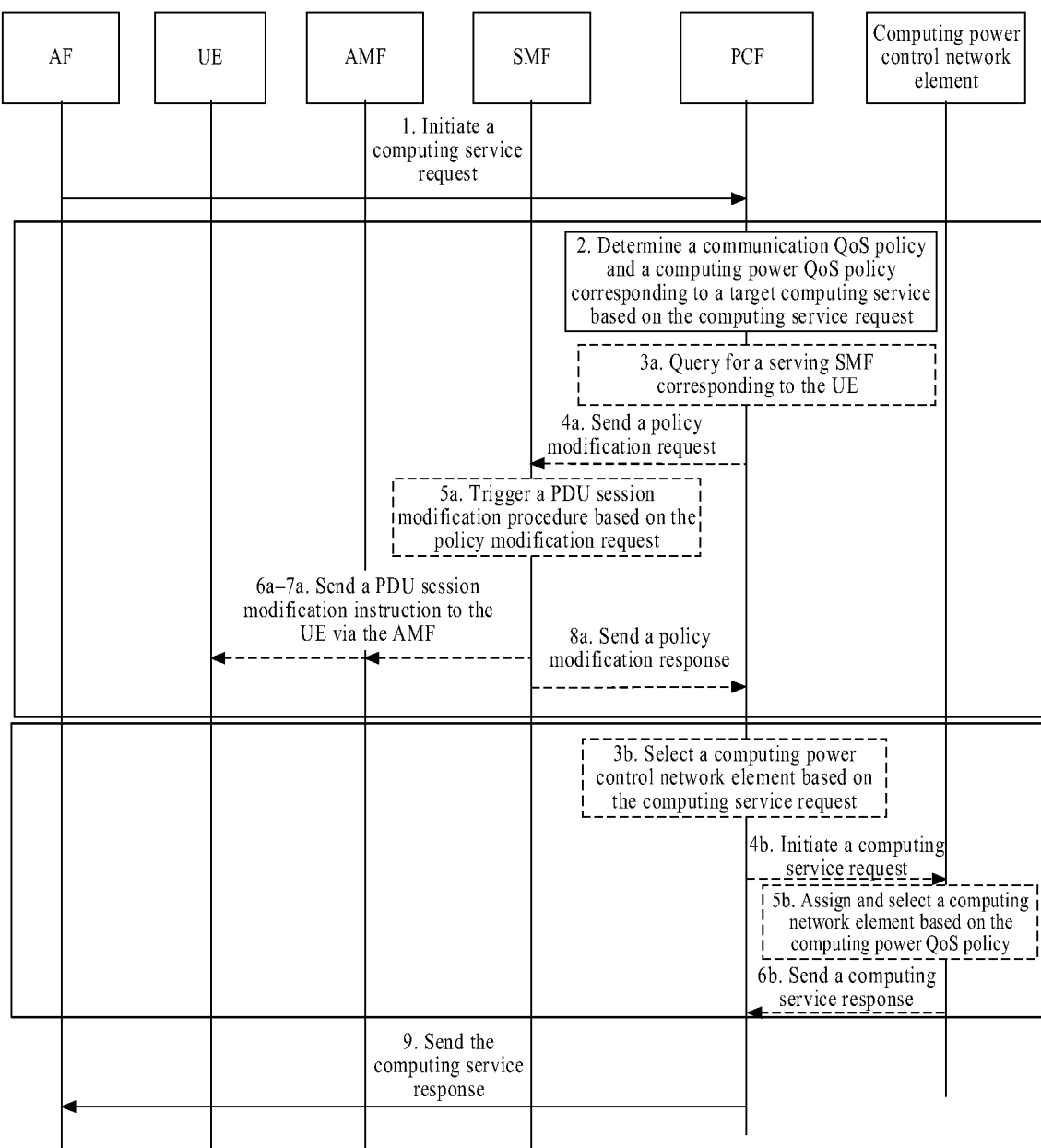
FIG. 5 is a third schematic flowchart of a resource allocation method for a computing service according to an embodiment of this application.

For example, as shown in FIG. 5, the technical solution provided in this embodiment may be implemented using the following steps.

Step 1. The AF sends a computing service request to the PCF, where the computing service request is used for requesting the network side to allocate corresponding computing power resources for a target computing service of the UE.

For example, the computing service request includes a UE ID (which may be an IP address, an external identifier, or the like of the UE) and at least one of the following information: a type of the computing service, an aim of the computing service, a computing session identifier (the computing session is a session that carries computing service description information of the target computing service), a service requirement of the computing service (including a latency requirement of the computing service and/or an accuracy rate requirement of the computing service).

For example, the computing service request is further used for requesting the network side to allocate corresponding communication resources for the target computing service of the UE. Further in this case, the computing service request includes a transmission requirement corresponding to a data flow of the target computing service. For example, the computing service request includes at least at least one of the following requirements: a data transmission bandwidth requirement, a data transmission latency requirement, or a data transmission packet loss rate requirement.

Step 2. The PCF determines a communication QoS policy and a computing power QoS policy corresponding to the target computing service based on the computing service request in step 1.

For example, this embodiment is implemented as follows. The AF sends overall service requirements of the target computing service to the PCF, and the PCF determines the corresponding computing power QoS policy and communication QoS policy based on the service requirements of the target computing service.

For example, the PCF needs to ensure that a sum of latency in the assigned communication QoS policy plus latency in the computing power QoS policy does not exceed the latency in the service requirement of the target computing service requested by the AF. In addition, the PCF needs to ensure that the data transmission accuracy in the assigned communication QoS policy (which may be 1-PER) multiplied by the computation accuracy in the computing power QoS policy is not lower than the accuracy in the service requirement of the target computing service requested by the AF. Refer to the foregoing descriptions for content about the communication transmission QoS policy and the computing power QoS policy, which is not repeated herein.

Optionally, after step 2, this embodiment may further include step 3a and/or step 3b.

Step 3a. The PCF queries for a serving SMF corresponding to the UE and sends a policy modification request to the serving SMF, so that the PCF can initiate a communication QoS policy modification procedure to the serving SMF subsequently.

For example, the PCF queries for the serving SMF corresponding to the UE based on its own history data or queries the UDM for the serving SMF corresponding to the UE.

Step 3b. The PCF selects a computing power control network element based on the computing service request in step 1.

Optionally, after step 2, this embodiment may further include step 4a and step 5a.

Step 4a. The PCF sends a policy modification request to the SMF, where the policy modification request includes the service information and the communication QoS policy for the target computing service. The policy modification request is used to trigger a communication QoS policy modification procedure, and the communication QoS policy modification procedure will then trigger the SMF to initiate a PDU session modification procedure for modifying a QoS flow or establishing a new QoS flow in the PDU session, so as to ensure that the QoS flow can match the QoS policy corresponding to the target computing service.

Step 5a. The SMF triggers a PDU session modification procedure based on the policy modification request.

Optionally, after step 2, this embodiment may further include steps 4b and step 5b.

Step 4b. The PCF initiates a computing service request to a computing power control network element, where the computing service request includes the computing power QoS policy. For example, the foregoing request message may further include computing service details of the target computing service.

Step 5b. The computing power control network element assigns and selects a computing network element based on the computing power QoS policy.

Optionally, after step 2, this embodiment may further include step 6a and step 7a.

Steps 6a and 7a. The SMF sends a PDU session modification instruction to the UE via an AMF.

Optionally, after step 2, this embodiment may further include step 6b.

Step 6b. A computing power control network element sends a computing service response to the PCF.

Step 8a. The SMF sends a policy modification response to the PCF for informing the PCF whether the communication QoS policy is successfully modified in step 4a.

Step 9. The PCF sends the computing service response to the AF.

In summary, the overall solution of this embodiment may include the following process. The AF requests the PCF to allocate the computing power resources based on the service requirement of the target computing service of the UE. The PCF allocates the communication QoS policy and computing power QoS policy for the target computing service. Then, the PCF initiates the PDU session modification procedure to the SMF, and initiates a computing power resource request procedure to the computing power control network element.

Embodiment 2

With reference to Embodiment 1, step 2 in Embodiment 1 may be replaced with step 2a. Step 2a includes: the PCF obtains a communication QoS policy and a computing power QoS policy corresponding to the target computing service from the computing service request in step 1.

That is, in this embodiment, the AF has broken down the service requirement of the target computing service into a computing power service requirement and a communication transmission service requirement, and then the PCF determines the corresponding computing power QoS policy and communication QoS policy based on the computing power service requirement and the communication transmission service requirement.

Embodiment 3

On the basis of Embodiment 1, an execution order is changed. Instead of executing the solution by the PCF on two network elements, the SMF executes the solution in serial.

Figure 6:
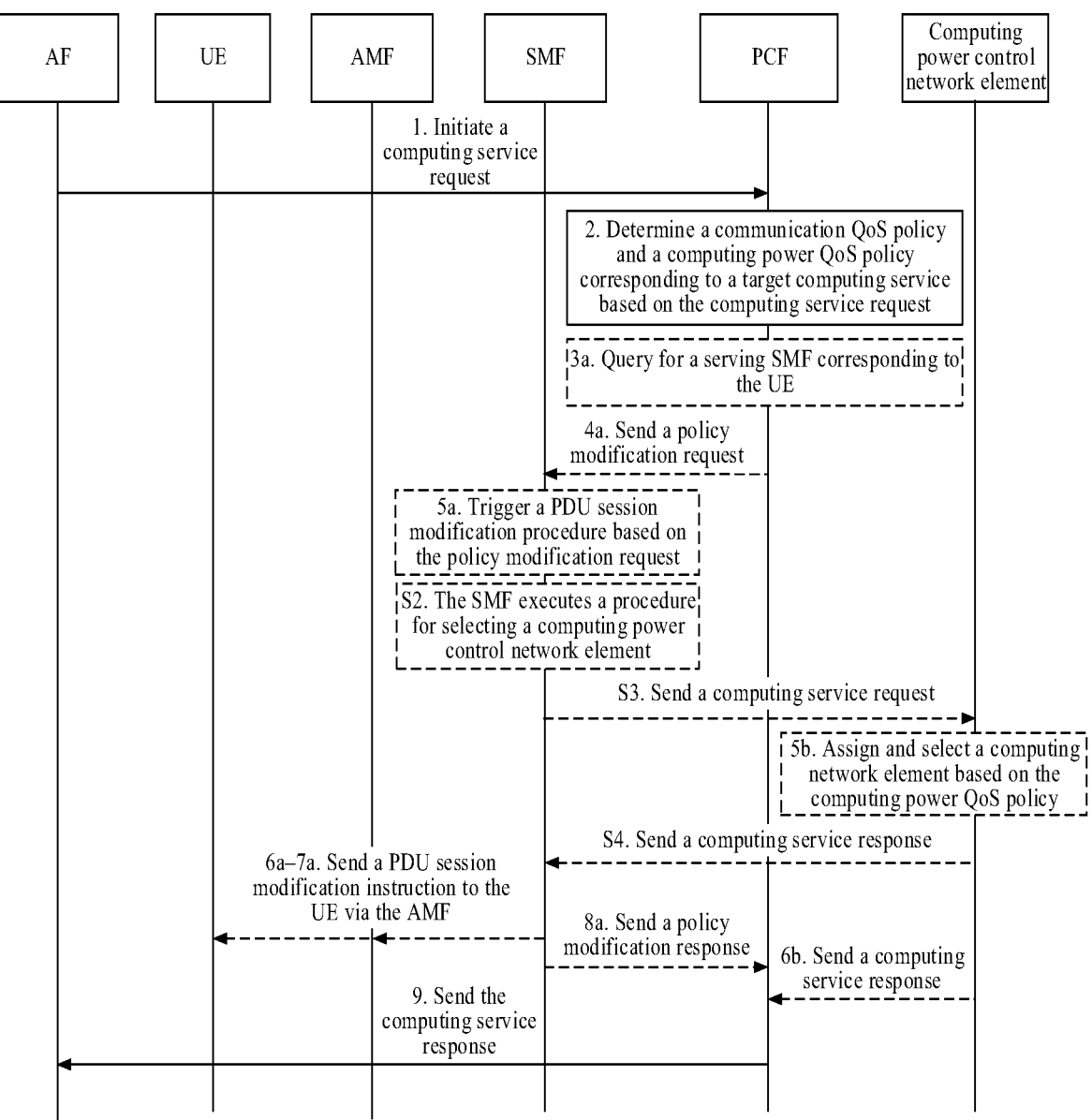
FIG. 6 is a fourth schematic flowchart of a resource allocation method for a computing service according to an embodiment of this application.

For example, as shown in FIG. 6, the technical solution provided in this embodiment may be implemented using the following steps.

Steps 1 and 2 are the same as steps 1 and 2 in Embodiment 1.

Step S1 is similar to steps 4a and 5a in Embodiment 1, with the only difference in what is sent. For example, the PCF sends both the communication QoS policy and the computing power QoS policy to the SMF.

Step S2. The SMF executes a procedure for selecting a computing power control network element. Refer to the procedure for the PCF to select a computing power control network element in Embodiment 1. Details are not described herein again.

Step S3. The SMF sends a computing service request (including computing power QoS information) to the computing power control network element.

Step S4. The computing power control network element sends a computing service response to the SMF.

In combination with FIG. 5 and FIG. 6, the remaining steps may be described with reference to Embodiment 1. To avoid repetition, details are not described herein again.

Embodiment 4

This embodiment is contrary to Embodiment 3. In this embodiment, the PCF first sends a computing service request (which carries assigned computing power QoS policy and computing power QoS policy and an SMF ID) to the computing power control network element, and then the computing power control network element triggers the SMF based on the SMF ID to execute a PDU session modification procedure for modifying or establishing a QoS flow to satisfy the communication QoS requirements.

Figure 7:
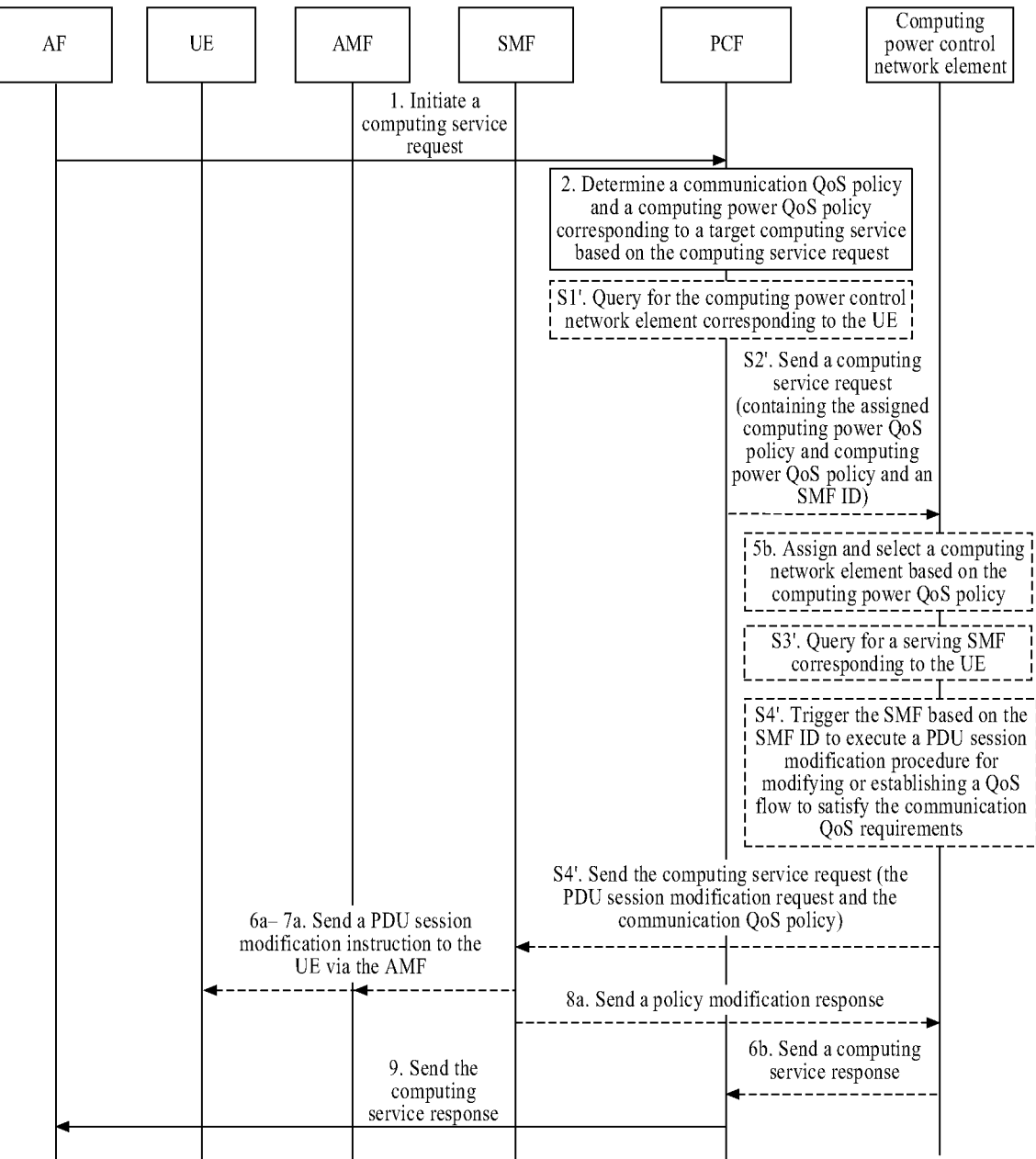
FIG. 7 is a fifth schematic flowchart of a resource allocation method for a computing service according to an embodiment of this application.

For example, as shown in FIG. 7, the technical solution provided in this embodiment may be implemented using the following steps.

Steps 1 and 2 are the same as steps 1 and 2 in Embodiment 1.

Step S1'. The PCF executes a procedure for selecting a computing power control network element (that is, querying for the computing power control network element corresponding to the UE). Refer to the procedure for the PCF to select a computing power control network element in Embodiment 1. Details are not described herein again.

Step S2'. The PCF sends a computing service request (including the assigned computing power QoS policy and computing power QoS policy, as well as an SMF ID) to the computing power control network element.

Step S3'. The computing power control network element queries for the serving SMF corresponding to the UE.

Step S4'. The computing power control network element triggers the SMF based on the SMF ID to execute a PDU session modification procedure for modifying or establishing a QoS flow to satisfy the communication QoS requirements. That is, the computing service request is sent to the SMF, which includes the PDU session modification request and the communication QoS policy.

In combination with FIG. 5 and FIG. 7, the remaining steps may be described with reference to Embodiment 1. To avoid repetition, details are not described herein again.

It should be noted that the policy determining method for a computing service in this embodiment of this application may be performed by a policy determining apparatus for a computing service or a control module for performing the policy determining method for a computing service in the policy determining apparatus for a computing service. The policy determining apparatus for a computing service provided in this embodiment of this application is described by using an example in which the policy determining apparatus for a computing service performs the policy determining apparatus for a computing service in the embodiments of this application.

It should be noted that the resource allocation method for a computing service in this embodiment of this application may be performed by a resource allocation apparatus for a computing service or a control module for performing the resource allocation method for a computing service in the resource allocation apparatus for a computing service. The resource allocation apparatus for a computing service provided in this embodiment of this application is described by using an example in which the resource allocation apparatus for a computing service performs the resource allocation apparatus for a computing service in the embodiments of this application.

Figure 8:
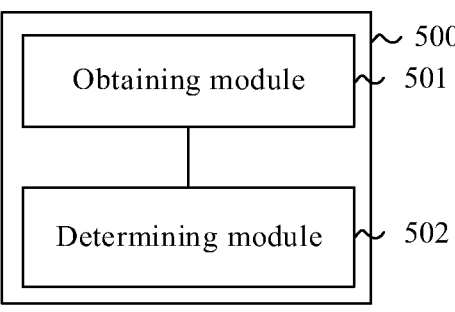
FIG. 8 is a schematic structural diagram of a policy determining apparatus for a computing service according to an embodiment of this application.

An embodiment of this application provides a policy determining apparatus for a computing service. As shown in FIG. 8, the apparatus 500 includes an obtaining module 501 and a determining module 502. The obtaining module 501 is configured to obtain a computing service request from a server, where the computing service request includes computing service description information of a target computing service of a terminal device, and the computing service request is used for requesting allocation of computing power resources for the target computing service. The determining module 502 is configured to determine a target quality of service QoS policy for the target computing service based on the computing service description information, where the target QoS policy includes a computing power QoS policy.

Optionally, the computing service request is further used for requesting allocation of communication resources for the target computing service, and the target QoS policy further includes a communication QoS policy.

Optionally, the computing service description information includes at least one of the following: a type of the computing service, an aim of the computing service, a service requirement of the computing service, an IP address of the computing service, and port number information corresponding to the computing service.

Optionally, the service requirement of the computing service includes at least one of the following: a latency requirement of the computing service or an accuracy rate requirement of the computing service.

Optionally, the determining module 502 is configured to: obtain a computing power QoS requirement by breaking down a service requirement of the computing service based on the computing service description information; and determine a computing power QoS policy for the target computing service based on the computing power QoS requirement.

Optionally, the determining module 502 is configured to: obtain a computing power QoS requirement and a communication QoS requirement by breaking down a service requirement of the computing service based on the service requirement of the computing service in the computing service description information; and determine the computing power QoS policy for the target computing service based on the computing power QoS requirement and the communication QoS policy for the target computing service based on the communication QoS requirement.

Optionally, the apparatus further includes a transmission module 503. The transmission module 503 is configured to send the computing power QoS policy to a computing power control network element, where the computing power QoS policy is used for the computing power control network element to allocate computing power resources for the target computing service.

Optionally, the transmission module is configured to send the computing power QoS policy to the computing power control network element via a session management network element.

Optionally, the transmission module is further configured to: receive from the computing power control network element, network element information of a computing network element corresponding to the computing power resources, where the network element information includes network element identifier information or network element address information; send a computing service response to the server, where the computing service response includes the network element information of the computing network element.

Optionally, the transmission module is further configured to send the communication QoS policy to a session management network element, where the communication QoS policy is used to trigger the session management network element to allocate the communication resources for the target computing service based on the communication QoS policy.

Optionally, the transmission module is further configured to: in a case that the communication QoS policy is different from a current communication QoS policy corresponding to the terminal device, send a policy modification request to the session management network element, where the policy modification request includes the communication QoS policy.

In the policy determining apparatus for a computing service provided in this embodiment of this application, after obtaining a computing service request for the target computing service of the terminal device from the server, the apparatus may assign a target quality of service QoS policy for the target computing serviced. The target QoS policy includes the computing power QoS policy. This ensures that the network of an operator can allocate corresponding computing power resources and/or communication resources for the target computing service. Therefore, the computing service-related data of the terminal device can be transmitted to the computing power resources, and a computing result is provided after computation by the computing power resources. This enables common terminal devices to complete computing services without requiring strong computing capability, reducing costs, power consumption, and the like for the terminal devices.

Figure 9:
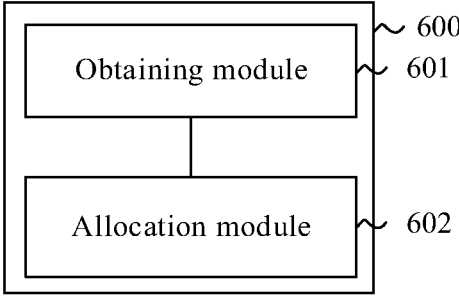
FIG. 9 is a first schematic structural diagram of a resource allocation apparatus for a computing service according to an embodiment of this application.

An embodiment of this application provides a resource allocation apparatus for a computing service. As shown in FIG. 9, the apparatus 600 includes an obtaining module 601 and an allocation module 602. The obtaining module 601 is configured to obtain service information and a communication QoS policy for a target computing service of a terminal device; and the allocation module 602 is configured to allocate communication resources for the target computing service based on the service information and the communication QoS policy.

Optionally, the allocation module 602 is configured to establish a tunnel for a PDU session of the terminal device based on the service information and the communication QoS policy; where the tunnel for the PDU session is used for transmitting data of the target computing service.

Optionally, the service information includes at least one of the following: computing service identification information, packet data unit PDU session identifier information associated with the computing service, computing service description information, a DNN, or S-NSSAI. The computing service description information includes at least one of the following: a type of the computing service, an aim of the computing service, a service requirement of the computing service, an IP address of the computing service, or port number information corresponding to the computing service.

Optionally, the service requirement of the computing service includes at least one of the following: a latency requirement of the computing service or an accuracy rate requirement of the computing service.

Optionally, the obtaining module 601 is configured to obtain a policy modification request from a policy control network element, where the policy modification request includes the service information and the communication QoS policy for the target computing service.

Optionally, the apparatus further includes a transmission module. The transmission module is configured to send a communication QoS policy request to the policy control network element, where the communication QoS policy request is used for requesting the communication QoS policy corresponding to the target computing service.

Optionally, an obtaining module 601 is configured to: obtain a computing power QoS policy corresponding to the target computing service from the policy control network element; and send the computing power QoS policy to a computing power control network element, where the computing power QoS policy is used for the computing power control network element to allocate computing power resources for the target computing service.

Optionally, the apparatus further includes a selecting module. The selecting module is configured to select the computing power control network element based on first information; where the first information includes at least one of the following: a target area, subscription information corresponding to the target computing service, or computing service description information.

Optionally, the transmission module is further configured to: receive a computing power QoS policy request from the computing power control network element, where the computing power QoS policy request is used for requesting the computing power QoS policy corresponding to the target computing service; and send the computing power QoS policy request to the policy control network element.

Optionally, the transmission module is further configured to: receive from the computing power control network element, network element information of a computing network element corresponding to the computing power resources, where the network element information includes network element identifier information or network element address information; and send the network element information to the policy control network element.

Optionally, the transmission module is further configured to send a PDU session modification instruction to the terminal device, where the PDU session modification instruction includes partial or complete information of the communication QoS policy.

Optionally, the transmission module is further configured to: send allocation status information of the communication resources to a computing power control network element; and/or receive allocation status information of computing power resources from a computing power control network element.

In the resource allocation apparatus for a computing service provided in this embodiment of this application, after obtaining the service information and the communication QoS policy for the target computing service, the apparatus may allocate communication resources for the target computing service based on the service information and the communication QoS policy for the target computing service. This ensures that the network of an operator can allocate corresponding communication resources for the target computing service. Therefore, the computing service-related data of the terminal device can be transmitted to the computing power resources through a corresponding PDU tunnel, and a computing result is provided after computation by the computing power resources. This enables common terminal devices to complete computing services without requiring strong computing capability, reducing costs, power consumption, and the like for the terminal devices.

Figure 10:
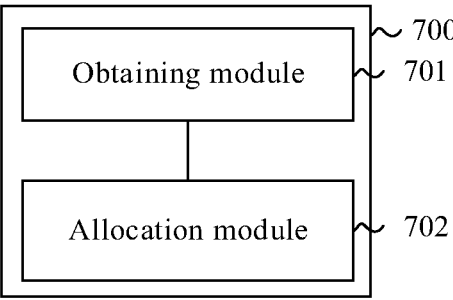
FIG. 10 is a second schematic structural diagram of a resource allocation apparatus for a computing service according to an embodiment of this application.

An embodiment of this application provides a resource allocation apparatus for a computing service. As shown in FIG. 10, the apparatus 700 includes an obtaining module 701 and an allocation module 702. The obtaining module 701 is configured to obtain service information and a computing power QoS policy for a target computing service of a terminal device; and the allocation module 702 is configured to allocate computing power resources for the target computing service based on the service information and the computing power QoS policy.

Optionally, the allocation module 702 is configured to select a computing network element based on the service information and the computing power QoS policy, where the computing network element is capable of providing the computing power resources corresponding to the target computing service.

Optionally, the computing power resources include at least one of the following: computing power resources or storage resources.

Optionally, the service information includes at least one of the following: computing service identification information, packet data unit PDU session identifier information associated with the computing service, computing service description information, a DNN, or S-NSSAI. The computing service description information includes at least one of the following: a type of the computing service, an aim of the computing service, a service requirement of the computing service, an IP address of the computing service, or port number information corresponding to the computing service.

Optionally, the service requirement of the computing service includes at least one of the following: a latency requirement of the computing service or an accuracy rate requirement of the computing service.

Optionally, the obtaining module 701 is configured to obtain the service information and the computing power QoS policy from a policy control network element; or obtain the service information and the computing power QoS policy from a session management network element.

Optionally, the apparatus further includes a transmission module. The transmission module is configured to send a computing power QoS policy request to the policy control network element, where the computing power QoS policy request is used for requesting the computing power QoS policy corresponding to the target computing service.

Optionally, the transmission module is further configured to send a first computing service response to a session management network element or a policy control network element; where the first computing service response includes network element information of a computing network element corresponding to the computing power resources, and the network element information includes network element identifier information or network element address information.

Optionally, the first computing service response further includes PDU session identifier information associated with the target computing service.

Optionally, the transmission module is further configured to: send allocation status information of the computing power resources to a session management network element; and/or receive allocation status information of communication resources from a session management network element.

Optionally, the computing power QoS includes at least one of the following: computing power, sample data amount, storage, computing latency, computation accuracy, or computing speed.

In the resource allocation apparatus for a computing service provided in this embodiment of this application, after obtaining the service information and the computing power QoS policy for the target computing service, the apparatus may allocate computing power resources for the target computing service based on the service information and the computing power QoS policy for the target computing service. This ensures that the network of an operator can allocate corresponding computing power resources for the target computing service. Therefore, the computing service-related data of the terminal device can be transmitted to the computing power resources, and a computing result is provided after computation by the computing power resources. This enables common terminal devices to complete computing services without requiring strong computing capability, reducing costs, power consumption, and the like for the terminal devices.

The resource allocation apparatus for a computing service or policy determining apparatus for a computing service in the embodiments of this application may be an apparatus or an apparatus or electronic device with an operating system, or may be a component, an integrated circuit, or a chip of a terminal. The apparatus or electronic device may be a network element, a node device, a server, a network attached storage (NAS), a personal computer (PC), or the like, which is not specifically limited in the embodiments of this application.

The resource allocation apparatus for a computing service or policy determining apparatus for a computing service provided in the embodiments of this application can implement corresponding processes implemented by the method embodiment illustrated above, with the same technical effects achieved. To avoid repetition, details are not described herein again.

Figure 11:
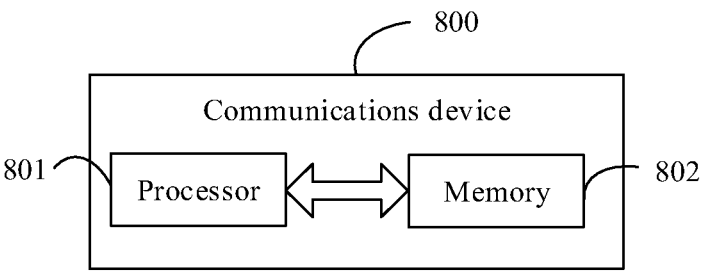
FIG. 11 is a schematic structural diagram of a communications device according to an embodiment of this application.

Optionally, as shown in FIG. 11, an embodiment of this application further provides a communications device 800, including a processor 801, a memory 802, and a program or instructions stored in the memory 802 and executable on the processor 801. For example, in a case that the communications device 800 is a network-side device, when the program or instructions are executed by the processor 801, the processes of the foregoing method embodiments are implemented, with the same technical effects. To avoid repetition, details are not described herein again.

An embodiment of this application further provides a network-side device including a processor and a communication interface. The network-side device embodiment is corresponding to the foregoing method embodiments applied to the network-side device. All the implementation processes and implementation methods of the foregoing method embodiments can be applied to the network-side device embodiment, with the same technical effects achieved.

In one example, the network-side device is a policy control network element, including a processor and a communication interface. The processor is configured to obtain a computing service request from a server, where the computing service request includes computing service description information of a target computing service of a terminal device, and the computing service request is used for requesting allocation of computing power resources for the target computing service. The processor is further configured to determine a target quality of service QoS policy for the target computing service based on the service information, where the target QoS policy includes a computing power QoS policy.

In one example, the network-side device is a session management network element, including a processor and a communication interface. The processor is configured to obtain service information and a communication QoS policy for a target computing service of a terminal device; and is further configured to allocate communication resources for the target computing service based on the service information and the communication QoS policy.

In one example, the network-side device is a computing power control network element, including a processor and a communication interface. The processor is configured to obtain service information and a computing power QoS policy for a target computing service of a terminal device; and the processor is further configured to allocate computing power resources for the target computing service based on the service information and the computing power QoS policy.

Figure 12:
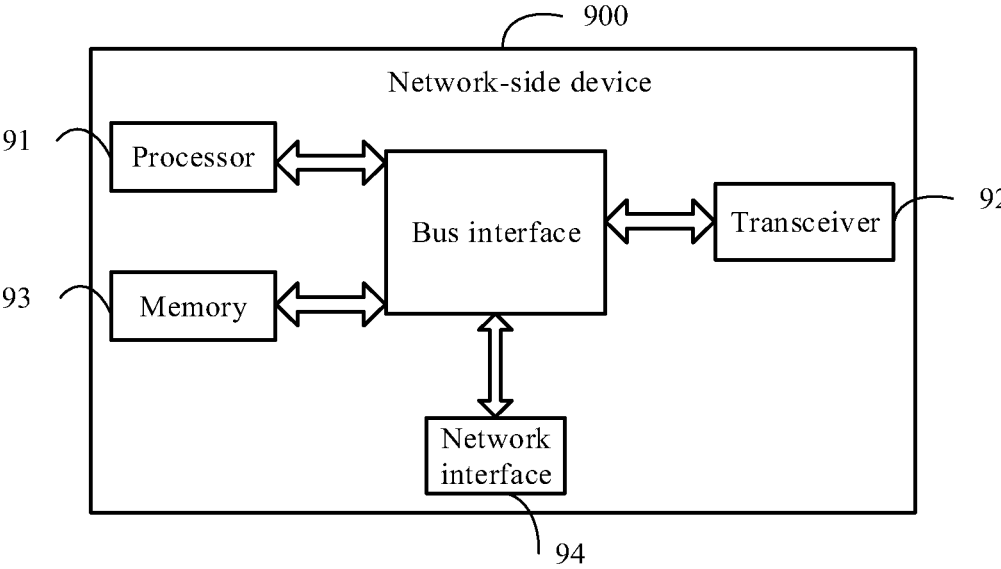
FIG. 12 is a schematic structural diagram of a network-side device according to an embodiment of this application.

An embodiment of this application further provides a network-side device. As shown in FIG. 12, the network-side device in this embodiment of this application includes a processor 91, a transceiver 92, a memory 93, a network interface 94, and a bus interface. In FIG. 12, a bus architecture may include any quantity of interconnected buses and bridges, for interconnecting various circuits of one or more processors represented by the processor 91 and a memory represented by the memory 93. The bus architecture may further interconnect various other circuits such as a peripheral device, a voltage regulator, and a power management circuit. These are all well known in the art, and therefore are not further described in this specification. The bus interface provides an interface. The transceiver 92 may be a plurality of components, that is, the transceiver 92 includes a transmitter and a receiver, and provides a unit for communicating with various other apparatuses on a transmission medium. The processor 91 is responsible for management of the bus architecture and general processing, and the memory 93 is capable of storing data that is used by the processor 91 during operation. In addition, the network-side device further includes some functional modules that are not shown. Details are not described herein.

The network-side device further includes a program or instructions stored in the memory 93 and executable on the processor 91. The processor 91 invokes the program or instructions in the memory 93 to implement the method performed by modules shown in FIG. 8, FIG. 9, or FIG. 10, with the same technical effects achieved. To avoid repetition, details are not described herein again.

An embodiment of this application further provides a non-transitory readable storage medium, where the non-transitory readable storage medium stores a program or instructions, and when the program or instructions are executed by a processor, the processes of the foregoing embodiments of the resource allocation method for a computing service or policy determining method for a computing service are implemented, with the same technical effects achieved. To avoid repetition, details are not described herein again.

The processor is the processor in the terminal in the foregoing embodiments. The non-transitory readable storage medium includes a non-transitory computer-readable storage medium, for example, a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or an instruction to implement the processes of the foregoing embodiments of the resource allocation method for a computing service or policy determining method for a computing service, with the same technical effects. To avoid repetition, details are not described herein again.

It should be understood that the chip mentioned in this embodiment of this application may also be referred to as a system-level chip, a system chip, a chip system, a system-on-chip, or the like.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a computer software product. The software product is stored in a non-transitory storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A policy determining method for a computing service, wherein the method comprises:

obtaining, by a policy control network element, a computing service request from a server, wherein the computing service request includes computing service description information of a target computing service of a terminal device, and the computing service request is used for requesting allocation of computing power resources and communication resources for the target computing service;

determining, by the policy control network element, a target quality of service (QoS) policy for the target computing service based on the computing service description information, wherein the target QoS policy comprises a computing power QoS policy and a communication QoS policy; and sending, by the policy control network element, service information and the communication QoS policy for the target computing service of the terminal device to a session management network element, and sending, by the policy control network element, the
service information and the computing power QoS
policy for the target computing service of the terminal
device to a computing power control network element;
wherein the communication QoS policy is used to trigger the
session management network element to allocate the
communication resources for the target computing ser-
vice based on the communication QoS policy; and the computing power QoS policy is used to trigger the
computing power control network element to allocate
the computing power resources for the target comput-
ing service based on the computing power QoS policy.

2. The method according to claim 1, wherein the com-
puting service description information comprises at least one
of the following: a type of the computing service, an aim of
the computing service, a service requirement of the com-
puting service, an IP address of the computing service, or
port number information corresponding to the computing
service.

3. The method according to claim 1, wherein the deter-
mining, by the policy control network element, a target QoS
policy for the target computing service based on the com-
puting service description information comprises:

obtaining, by the policy control network element, a com-
puting power QoS requirement by breaking down a
service requirement of the target computing service
based on the computing service description informa-
tion; and determining, by the policy control network element, the
computing power QoS policy for the target computing
service based on the computing power QoS require-
ment.

4. The method according to claim 1, wherein the deter-
mining, by the policy control network element, a target QoS
policy for the target computing service based on the com-
puting service description information comprises:

obtaining, by the policy control network element, a com-
puting power QoS requirement and a communication
QoS requirement by breaking down a service require-
ment of the computing service based on the service
requirement of the computing service in the computing
service description information; and determining, by the policy control network element, the
computing power QoS policy for the target computing
service based on the computing power QoS require-
ment and the communication QoS policy for the target
computing service based on the communication QoS
requirement.

5. The method according to claim 1, wherein after send-
ing, by the policy control network element, the computing
power QoS policy to the computing power control network
element, the method further comprises:

receiving, by the policy control network element from the
computing power control network element, network
element information of a computing network element
corresponding to the computing power resources,
wherein the network element information comprises
network element identifier information or network ele-
ment address information; and sending, by the policy control network element, a com-
puting service response to the server, wherein the
computing service response includes the network ele-
ment information of the computing network element.

6. The method according to claim 1, wherein sending, by
the policy control network element, the communication QoS
policy to the session management network element com-
prises:

in a case that the communication QoS policy is different
from a current communication QoS policy correspond-
ing to the terminal device, sending, by the policy
control network element, a policy modification request
to the session management network element, wherein
the policy modification request includes the communi-
cation QoS policy.

7. A resource allocation method for a computing service,
wherein the method comprises:

obtaining, by a session management network element,
service information and a communication quality of
service (QoS) policy for a target computing service of
a terminal device from a policy control network ele-
ment; and allocating, by the session management network element,
communication resources for the target computing ser-
vice based on the service information and the commu-
nication QoS policy;

wherein the communication QoS policy is used to trigger
the session management network element to allocate
the communication resources for the target computing
service based on the communication QoS policy;

wherein the method further comprises:

obtaining, by the session management network element, a
computing power QoS policy corresponding to the
target computing service from the policy control net-
work element; and sending, by the session management network element, the
service information and the computing power QoS
policy to a computing power control network element,
wherein the computing power QoS policy is used to
trigger the computing power control network element
to allocate computing power resources for the target
computing service based on the computing power QoS
policy.

8. The method according to claim 7, wherein the allocat-
ing, by the session management network element, commu-
nication resources for the target computing service based on
the service information and the communication QoS policy
comprises:

establishing, by the session management network ele-
ment, a tunnel for a packet data unit (PDU) session of
the terminal device based on the service information
and the communication QoS policy; wherein the tunnel for the PDU session is used for transmitting
data of the target computing service.

9. The method according to claim 7, wherein the service
information comprises at least one of the following: com-
puting service identification information, PDU session iden-
tifier information associated with the computing service,
computing service description information, a data network
name (DNN), or single network slice selection assistance
information (S-NSSAI); wherein the computing service description information comprises
at least one of the following: a type of the computing
service, an aim of the computing service, a service
requirement of the computing service, an IP address of
the computing service, or port number information
corresponding to the computing service.

10. The method according to claim 7, wherein the obtain-
ing, by a session management network element, service information and a communication QoS policy for a target computing service of a terminal device from a policy control network element comprises:

obtaining, by the session management network element, a policy modification request from the policy control network element, wherein the policy modification request includes the service information and the communication QoS policy for the target computing service.

11. A resource allocation method for a computing service, wherein the method comprises:

obtaining, by a computing power control network element, service information and a computing power quality of service (QoS) policy for a target computing service of a terminal device from a policy control network element or a session management network element; and allocating, by the computing power control network element, computing power resources for the target computing service based on the service information and the computing power QoS policy;

wherein the computing power QoS policy is used to trigger the computing power control network element to allocate the computing power resources for the target computing service based on the computing power QoS policy;

wherein the session management network element is used to obtain the computing power QoS policy and a communication QoS policy from the policy control network element, and the communication QoS policy is used to trigger the session management network element to allocate communication resources for the target computing service based on the communication QoS policy.

12. The method according to claim 11, wherein the allocating, by the computing power control network element, computing power resources for the target computing service based on the service information and the computing power QoS policy comprises:

selecting, by the computing power control network element, a computing network element based on the service information and the computing power QoS policy; wherein the computing network element is capable of providing the computing power resources for the target computing service.

13. The method according to claim 11, wherein the obtaining, by a computing power control network element, service information and a computing power QoS policy for a target computing service of a terminal device from a policy control network element or a session management network element comprises:

obtaining, by the computing power control network element from the policy control network element, the service information and the computing power QoS policy; or obtaining, by the computing power control network element, the service information and the computing power QoS policy from the session management network element.

14. The method according to claim 11, wherein after the allocating, by the computing power control network element, computing power resources for the target computing service based on the service information and the computing power QoS policy, the method further comprises:

sending, by the computing power control network element, a first computing service response to the session management network element or the policy control network element; wherein the first computing service response includes network element information of a computing network element corresponding to the computing power resources, and the network element information comprises network element identifier information or network element address information.

15. A policy control network element, comprising a processor, a memory, and a program or instructions stored in the memory and executable on the processor, wherein when the program or instructions are executed by the processor, the steps of the policy determining method for a computing service according to claim 1.

16. A session management network element, comprising a processor, a memory, and a program or instructions stored in the memory and executable on the processor, wherein when the program or instructions are executed by the processor, the steps of the resource allocation method for a computing service according to claim 7.

17. A computing power control network element, comprising a processor, a memory, and a program or instructions stored in the memory and executable on the processor, wherein when the program or instructions are executed by the processor, the steps of the resource allocation method for a computing service according to claim 11.

* * * * *